United States Patent [19]

Hamilton

[11] 4,423,450
[45] Dec. 27, 1983

[54] MAGNETIC HEAD AND MULTITRACK TRANSDUCER FOR PERPENDICULAR RECORDING AND METHOD FOR FABRICATING

[75] Inventor: Harold J. Hamilton, Sylmar, Calif.

[73] Assignee: Censtor Corporation, San Jose, Calif.

[21] Appl. No.: 260,899

[22] Filed: May 6, 1981

[51] Int. Cl.³ .................................................. G11B 5/20
[52] U.S. Cl. ...................................... 360/111; 360/123
[58] Field of Search ........................ 360/111, 112–113, 360/115, 119, 122–123, 125–126, 134; 29/603

[56] References Cited

U.S. PATENT DOCUMENTS

| | | | |
|---|---|---|---|
| 2,905,770 | 9/1959 | Kornei | 360/111 |
| 3,152,225 | 10/1964 | Peters | 360/115 |
| 3,454,727 | 7/1969 | Siera et al. | 360/111 |
| 4,138,702 | 2/1979 | Magnenet | 360/125 |
| 4,317,148 | 2/1982 | Chi | 360/119 |

FOREIGN PATENT DOCUMENTS

| | | | |
|---|---|---|---|
| 54-34205 | 3/1979 | Japan | 360/119 |
| 56-3422 | 1/1981 | Japan | 360/111 |

*Primary Examiner*—John H. Wolff
*Attorney, Agent, or Firm*—Spensley, Horn, Jubas & Lubitz

[57] ABSTRACT

An improved recording and read head particularly suited for use with perpendicular recording techniques. The recording head can be fabricated either as a single head or as a multitrack array. If fabricated as a multitrack array, the head includes a plurality of main poles spaced closely to one another and a common long flux closing pole which completes a magnetic circuit between the main poles and the recording medium. Each main pole of the head array is individually addressable with a purpose of recording or reading by means of a flux gate arrangement. The flux gate may be utilized so that the head operates either in a conventional fashion by detecting the rate of change of induced flux or by detecting the magnitude of the induced flux.

37 Claims, 18 Drawing Figures

STATIONARY MEDIUM

MOVING MEDIUM

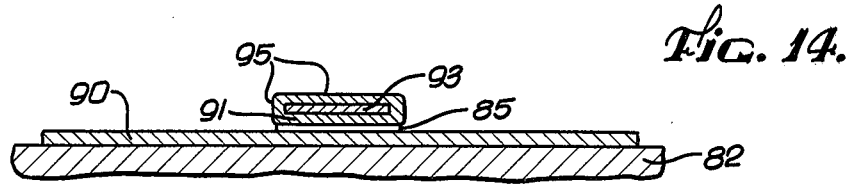
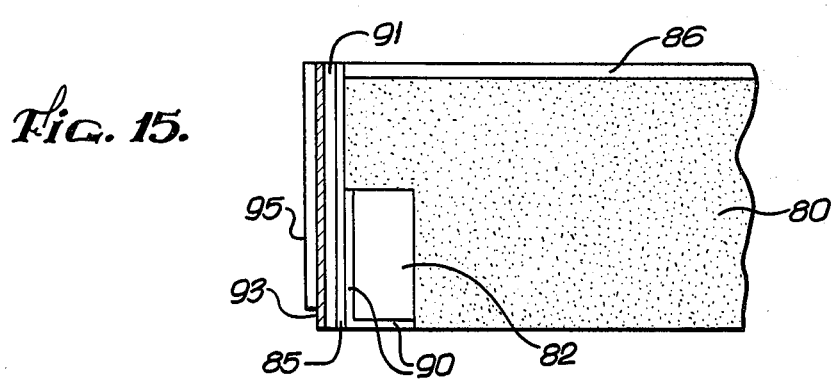
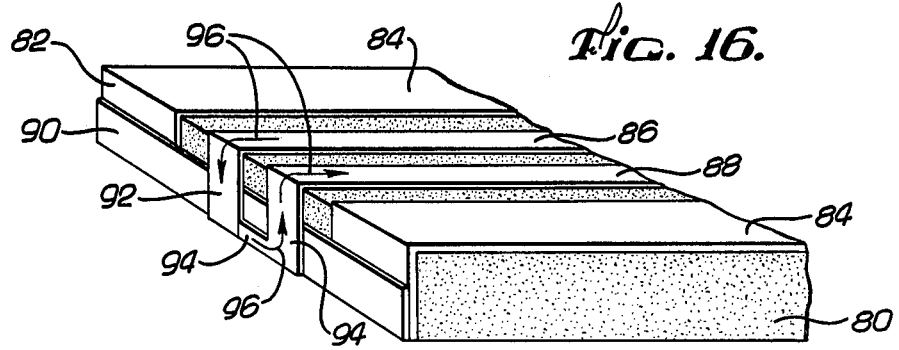
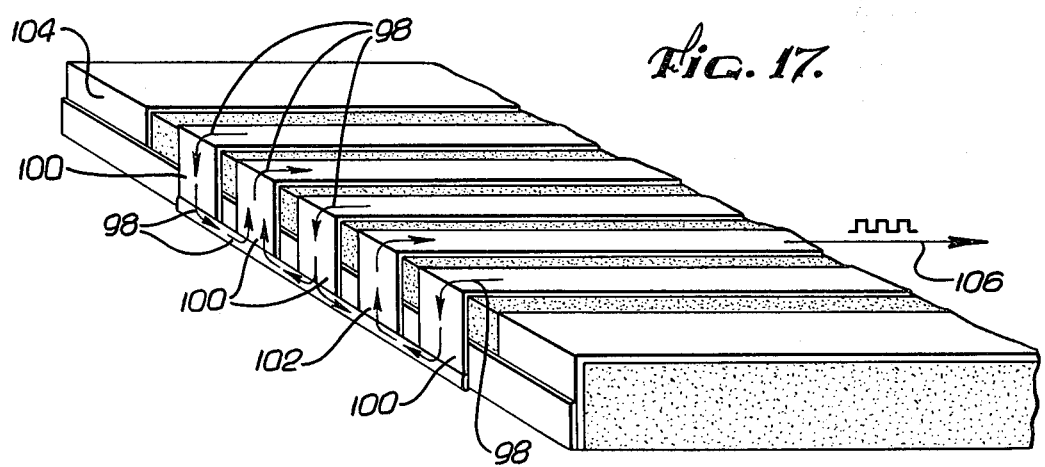

MAGNETIC HEAD AND MULTITRACK TRANSDUCER FOR PERPENDICULAR RECORDING AND METHOD FOR FABRICATING

BACKGROUND OF THE INVENTION

1. Field of the Invention

This invention relates to magnetic recording and in particular to perpendicular digital recording in which information is recorded in the form of digital bits.

The demand for increasing performance and capacity of moving media magnetic data storage systems for use with computers has led to the analysis of the limitations of conventional recording technology. In conventional longitudinal recording, recording is accomplished by magnetizing the magnetic recording medium (e.g., iron oxide) in a direction parallel to the surface of the carrier of the medium. Generally, a ring type recording head is employed in which recording is accomplished by passing the medium across the pole gap. The limitations of this technology relate principally to the problems of increasing media demagnetization with increasing recording (i.e., bit) density and the very low energy efficiency of conventional ring type heads. While significant progress has been made in recent years in the development of ultra thin recording media and thin film heads, the above problems remain as fundamental limitations inherent in the conventional longitudinal recording process.

In perpendicular recording, the recording medium is magnetized in a direction perpendicular to the plane of the medium. Essentially all of the flux generated in the poles of the recording head passes through the medium, resulting in a very high energy efficiency. Despite its great potential, a number of problems have inhibited the development of perpendicular recording technology. Notable among these are the lack of media suitable for recording in the perpendicular mode and the lack of a practical head design, particularly a multihead array.

2. Description of the Prior Art

In the initial development of perpendicular recording technology, a head was utilized which resembled a conventional ring type longitudinal recording head, i.e., it included a pair of recording poles having a gap therebetween. Such a head is shown in U.S. Pat. No. 3,454,727 to Siera et al. In order to record in a perpendicular fashion, the recording medium is moved through the gap between the poles. Such a requirement presents substantial problems in terms of transport and medium design. Prior art attempts to overcome this problem have involved the development of new head designs operating in conjunction with a modified recording medium. One form of modified recording medium includes a magnetizable layer which overlies a high permeability substrate. One form of modified head includes a narrow recording pole and a long flux closing pole. The combination of the modified magnetic head and recording medium forms a magnetic circuit, with the high permeability substrate providing a low reluctance return path from one pole of the head to the other. In order to record, a strong magnetic field is applied to the magnetizable layer of the medium in the area underlying the recording pole. The flux then passes through the substrate and back to the recording pole through the long flux closing pole, thereby forming a closed magnetic circuit in which the magnetic flux in the medium directly under the poles of the head is oriented perpendicular to the plane of the recording medium. The cross-sectional area of the long flux closing pole is much larger than that of the narrow recording pole to insure that the flux density at the flux closing pole is insufficient to magnetize the medium. Recording systems of this type are disclosed in U.S. Pat. Nos. 2,840,440 to McLaughlin et al. and 4,138,702 to Magnenet, and in Japanese Pat. Nos. 52-78403 to Iwasawa and 54-59108 to Nakagawa. Other prior art relating to perpendicular recording that should be considered to fully appreciate the subject invention are the following: S. Iwasaki, Y. Nakamura and K. Ouchi, Perpendicular Magnetic Recording with a Composite Anisotropy Film, *IEEE Transactions on Magnetics,* Vol. 15 No. 6, November 1979; Robert I. Potter and Irene A. Beardsley, Self-Consistent Computer Calculations for Perpendicular Magnetic Recording, *IEEE Transactions on Magnetics,* Vol. 16, No. 5, September, 1980; U.S. Pat. No. 4,251,842 issued Feb. 17, 1981 to S. Iwasaki et al; Japanese Patent Applications Nos. 51-51574 and 51-106506, respectively laid open to the public on Nov. 11, 1977 under unexamined publication number 134,706/77 and Mar. 25, 1978 under unexamined publication number 32,009/786 and U.S. Pat. No. 4,253,127 issued Feb. 24, 1981 to T. Kodama and T. Yanagida.

In addition to the development of a suitable unitary magnetic head, perpendicular recording technology is confronted in common with longitudinal technology, with the difficulty of fabricating high track density multihead arrays. In order to achieve the highest possible recording density, it is desirable to have as many tracks as possible for a particular width of recording medium. The reduction of head to head spacing in such multihead arrays has been limited by the need to allow adequate space between adjacent poles for the fabrication of read/write windings and their conductors. Both the McLaughlin et al. and Magnenet patents disclose multitrack heads which utilize a separate read/write coil for each head. In Magnenet, track density is doubled by providing two arrays of heads which are offset with respect to each other by a distance equal to one half of the spacing, between individual heads. Each array of heads records on alternately spaced tracks on the recording medium.

In addition to physical head design, the mode of operation of a head is important in achieving maximum density. As recording density increases, it becomes more difficult to read the recorded information. Conventional magnetic read heads sense the time rate of change of magnetic flux produced by the motion of the medium past the pole tips of the head. Increasing the relative speed of the medium past the pole tips increases the performance, since the induced flux rate of change is increased.

Various head designs have been developed in which the head is responsive to the intensity of the induced flux rather than the time rate of change of flux. Such flux responsive heads are disclosed in U.S. Pat. Nos. 3,375,332 to Geyder, 3,242,269 to Pettengill, 3,444,331 and 3,444,332 to Brown, Jr., 3,696,218 to Eumura, 4,123,790, 4,136,371, 4,136,370 and 4,182,987 to Moeller, 4,120,011 to Kolb, Jr., 4,137,554 to McClure and 4,164,770 to Jeffers. A common type of flux sensitive head is referred to as a flux gate head and operates by periodically saturating a portion of the high permeability core of a magnetic head, thereby causing the reluctance of the magnetic circuit to increase rapidly to a high value and giving rise to a sudden decrease of flux in the magnetic circuit to a very low level. The flux gate may be activated once each bit period (at the time of maximum flux intensity), thereby producing a rapid change of flux in the magnetic circuit and generating an emf in the sense winding whose amplitude and polarity correspond to the intensity and polarity of the recorded bit. Alternatively, the flux gate may be activated several or more times during each bit period, thereby generating an AC signal whose amplitude varies in accordance with the flux intensity produced by the medium and whose phase (relative to the flux gate current) corresponds to the polarity of residual flux in the medium. The motion of the medium plays no essential role in generating the read signal in either case.

Flux sensitive magnetic heads for use in perpendicular recording have been disclosed in U.S. Pat. Nos. 3,454,727 to Siera et al. and 3,651,502 to Flora. The Siera et al. patent discloses a plural track flux gated head in which flux gate excitation or saturation current is applied to each pole of the head (i.e., every pole is saturated simultaneously). The head of the Flora patent does not utilize a flux gate arrangement. Rather, a bias signal is applied to the head and sensed at the output of the head. The design of the head is such that the magnitude of the output signal will be reduced if a magnetic field is present in the portion of the recording medium being sensed since the magnetic field of the recording medium cancels magnetic flux caused by the application of the bias signal to the head.

SUMMARY OF THE INVENTION

The present invention is directed to a novel magnetic recording head and multihead array for use in perpendicular recording, and specifically digital recording. The invention results in a significant increase in track as well as linear recording densities, signal amplitude and signal to noise ratio and improved bit shaft characteristics, while taking full advantage of the high energy efficiency characteristic of the perpendicular mode of recording. Moreover, it enables the fabrication of very high track density multihead arrays, which utilize a common read/write winding for all heads in the array, provides a unique method of addressing tracks; and permits simultaneous recording or reading on more than one track, thereby greatly facilitating communication with mass data storage systems. Track density has, in part, been increased by incorporating a common read/write winding and lead pair for all poles in the multitrack array, thereby circumventing the need to allow space between poles (tracks) for individual windings and lead pairs.

In one specific embodiment, the head design utilizes a flux gate in order to provide a large amplitude read signal and signal to noise ratio independent of the velocity of the medium, thereby facilitating recording and reading stationary as well as rapidly moving media. In another embodiment of the invention, flux gates are utilized to provide an addressing function in a multitrack head, and the heads may be employed in the read mode either in the conventional way to sense the time rate of change of flux produced by the motion of the medium or to sense flux intensity, independent of medium velocity. In addition, the flux gates may be utilized in the record mode to control the magnetization of the medium as well as (in multihead arrays) to address tracks.

By utilizing thin film photolithographic and vacuum and electrochemical deposition techniques to produce the heads of the present invention, extremely high linear and track recording densities can be achieved. Such construction when combined with other aspects of the invention (e.g., perpendicular recording, head configuration, flux gate, common read/write winding) enable the realization of improved linear and track densities. Linear bit densities on the order of $4 \times 10^4$ bits per centimeter (100,000 bits per inch) and track densities of $10^3$ tracks per centimeter (2,500 tracks per inch) are achievable, with potential densities being still higher.

BRIEF DESCRIPTION OF THE DRAWINGS

In the drawings, which are not to scale:

FIGS. 7 and 17 are perspective views of a multitrack transducer employing a common drive/sense winding;

FIGS. 10–16 show a head of the type illustrated in FIG. 3 at various stages of the fabrication process.

DETAILED DESCRIPTION OF THE DRAWINGS

Figure 1:
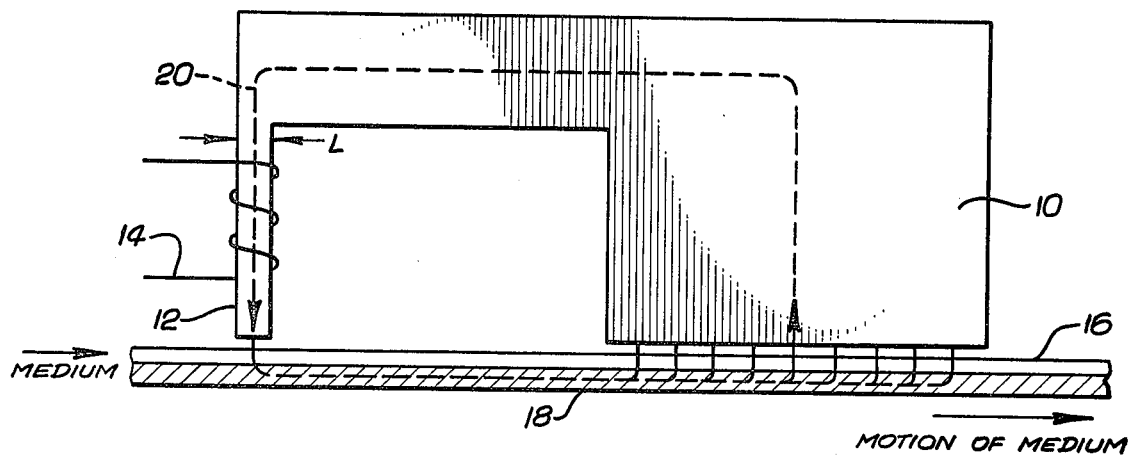
FIG. 1 is a side plan view of a prior art perpendicular recording head.

Referring to FIG. 1, a prior art perpendicular recording head similar to that shown in the Magnenet and McLaughlin et al. patents is shown. The recording head is made of high permeability material such as ferrite and includes a long flux closing pole 10, a short main pole 12 having a length L and a read/write coil 14. The recording medium includes a magnetizeable layer 16 carried on a high permeability, low reluctance substrate 18. In order to record, current is passed through the coil 14, thus setting up a flux path 20. The field strength in the medium 16 underneath the main pole 12 is relatively high and is sufficient to magnetize the layer 16 under the main pole to thereby record information. The flux closing pole 10 provides a low reluctance path back to the main pole 12 and, more importantly, a low flux density linkage via the substrate 18 through the layer 16 and air gap between the medium and recording head. This is essential in the record mode in order to avoid any possibility of recording over or altering the character of information previously recorded. To accomplish this, the magnetic field strength in the area underneath the flux closing pole 10 must be well below the coercive force of the recording medium 16. The energy efficiency of such a system can be on the order of eighty percent or higher, as compared to efficiencies of the order of one percent for conventional ring type longitudinal recording heads.

Experimental and theoretical investigations have demonstrated that heads of the type shown in FIG. 1 (sometimes referred to as single-pole heads) are capable of recording on perpendicularly oriented media at very high densities (well in excess of 100,000 bits per inch). However, the capability of such heads for reading information recorded at high densities, i.e., for resolving closely spaced flux transitions and with minimal bit shift, is less satisfactory. Iwasaki et al. referred to in the prior art section of this specification have reported the use of conventional ring type heads to read high density records produced with single-pole type heads. Potter and Beardsley referred to in the prior art section of this specification have shown that conventional narrow-gap (ring or thin film) heads may be used to record as well as read data on perpendicularly oriented media and that, for equivalent design parameters and head medium separation of 0.25 micrometer, the read resolution and bit shift characteristics of such heads are somewhat superior to the performance of single-pole heads. Nevertheless, it is clear that the capabilities for very high density recording on perpendicular media are not matched by the capabilities for reading such records, and that further reduction of head-medium separation to the limit of physical (sliding) contact is essential if the full potential of perpendicular recording technology is to be realized. However, running the head in contact with the medium would severely limit medium velocity (in order to avoid excessive wear of the head and medium and insure close contact), and this in turn would all but preclude the use of conventional heads that sense time rate of change of flux, since signal amplitude and signal to noise ratio in such heads are dependent on medium velocity. Thus it has been recognized that there is a need for transducers which are capable of sensing the intensity and polarity of residual flux in a perpendicularly oriented medium, independent of medium velocity. Moreover, since reduction of medium velocity leads to lower data rates, means for offsetting this reduction of data rate and preferably greatly increasing the speed and flexibility of communication with the data storage system would be desirable. The manner in which this may be accomplished by the subject invention well be explained later by the specification.

Figure 2:
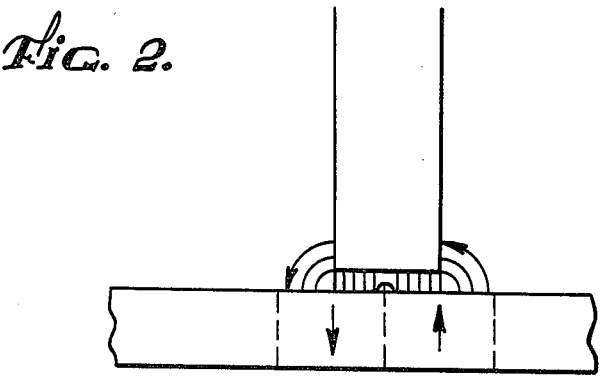
FIG. 2 is a side plan view showing field distribution between the main pole and the medium for the head of FIG. 1.

The relative disadvantage of the single-pole head in read resolution and bit shift characteristics, mentioned above, is due to the deleterious effects of fringe fields which extend from the medium to the sides of the main pole, as shown in FIG. 2. To the extent that the fringe fields represent a significant contribution to the total flux induced in the main pole, the main pole appears to be longer than its physical length and therefore less capable of resolving closely spaced flux transitions. Similarly, the fringe fields to some extent determine the position or timing of a flux transition and therefore the extent of bit shift in multiple transitions. The smaller the head-medium separation and the greater the permeability of the pole tip the smaller the contribution of the fringe fields to the total flux induced in the main pole. Thus, as the head-medium separation is made vanishingly small (assuming a relatively large effective permeability at the pole tip), the fringe fields become less significant and the read resolution and bit shift characteristics are optimized. It should be noted also that the lateral resolution of the head is similarly improved as the head-medium separation is decreased, thereby decreasing cross talk between adjacent tracks and enabling significant increase in track density.

Figure 3:
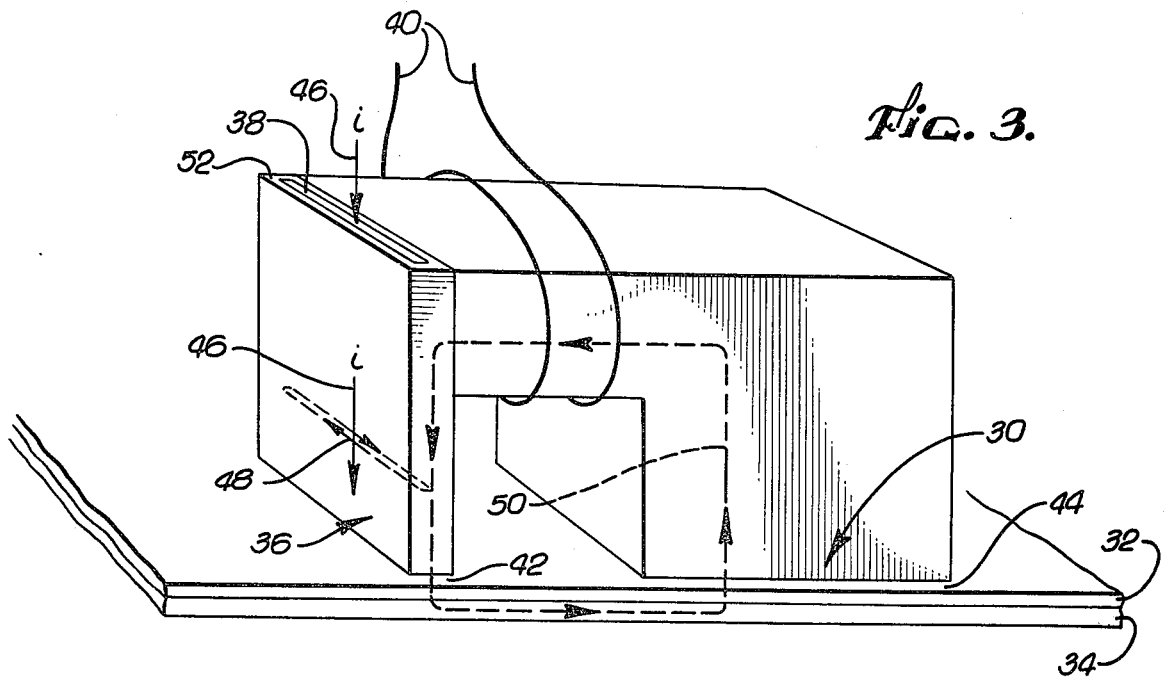
FIG. 3 is a perspective view of a preferred embodiment of the present invention.

The essential features of a preferred embodiment of the present invention which overcomes certain of the above discussed problems and achieves the objectives of the invention are schematically illustrated in FIG. 3. The transducer is comprised of a flux-closing pole 30 of high permeability material, e.g., ferrite, joined to a flux-gated main pole 36 of high permeability, low conductivity material 52, e.g., permalloy, which uniformly surrounds a nonmagnetic, high conductivity conductor 38, e.g., copper, over substantially its entire height. A drive/sense winding 40 is coupled to the magnetic circuit formed by the main pole 36, the gap 42 between the main pole and the medium, the perpendicularly oriented medium 32 (having high coercivity and residual magnetization), the high permeability substrate or layer 34 underlying the medium, the gap 44 between the medium and the flux-closing pole, and the flux-closing pole 30.

The length (in the direction of motion of the medium) of the main pole determines the minimum bit length which may be read and therefore the linear bit density. Thus, a main pole one micrometer in length would be capable of recording and reading approximately 10,000 bits/cm (25,000 bits/inch). The height of the main pole is determined by the requirement that the height be large relative to the length of the main pole to insure adequate performance of the flux gate (preferably more than 20 times the length of the main pole) and by space requirements for the fabrication of the drive/sense winding. Typically, the height of the main pole is of the order of 50 micrometers. The distance from the main pole to the flux-closing pole is comparable to the height of the main pole. The length of the flux-closing pole must be an order of magnitude or more greater than that of the main pole, as discussed earlier. The thickness of the medium 32 is of the order of one micrometer, and the thickness of the underlying high permeability substrate or layer 34 (of the order of one micrometer) is such as to provide a low reluctance path for flux to pass to the flux-closing pole 30.

Information is recorded by closing the flux gated main pole 36 (main pole unsaturated) and passing a current (with appropriate polarity reversals) through the drive winding 40 sufficient to saturate the medium 32 in a direction perpendicular to the plane of the medium. The current through the drive winding 40 necessary to saturate the medium 32 is determined by the coercive force of the medium (typically 1000-2000 oersteds), the thickness of the medium 32, the length of the air gap 42 between the medium and the main pole and the number of turns in the drive winding 40. Typically, a magnetomotive force of the order of 0.5 ampere-turns is sufficient to saturate the medium. The flux density in the main pole 36 and all other elements of the magnetic circuit is well below the saturation levels of the materials involved, and the field strength in the medium underlying the flux-closing pole is much less than the coercive force of the medium, thus having no effect on the state of magnetization of the medium in that area.

Figure 4:
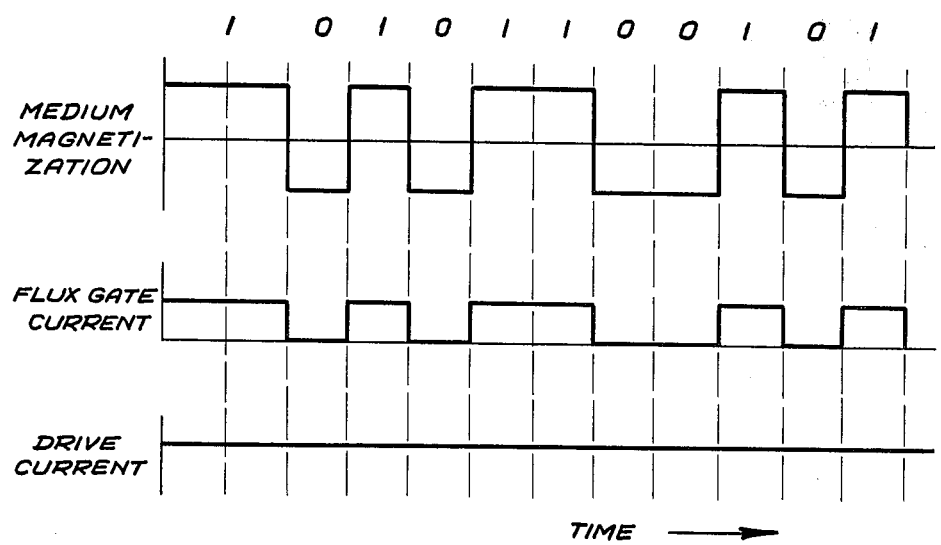
FIG. 4 is a series of graphs that illustrates the action of the flux gate in one mode of recording for the head of FIG. 3.

In an alternative mode of recording, the area of the medium to be recorded is first erased (uniformly magnetized in one direction), after which the flux gate is opened (main pole 36 is saturated) and the polarity of the drive current is reversed. Recording is then accomplished in a subsequent cycle of the medium by closing and opening the flux gate at appropriate intervals, thus reversing the polarity of magnetization of the medium in the desired locations. When the main pole is saturated, the field strength in the medium underlying the main pole is well below the coercive force of the medium and is therefore insufficient to cause magnetization reversal. When the flux gate current is turned off and main pole 36 is no longer saturated, the field strength in the medium underlying the main pole 36 rapidly rises, causing the magnetization of the medium to reverse its polarity. One advantage of this mode of recording is that a relatively small flux gate current may be used to control the recording process, thus realizing a significant amount of gain and simplifying the record circuitry. The relationship of flux gate current, drive current and media magnetization in this mode of recording is illustrated in the graphs of FIG. 4.

Figure 5A:
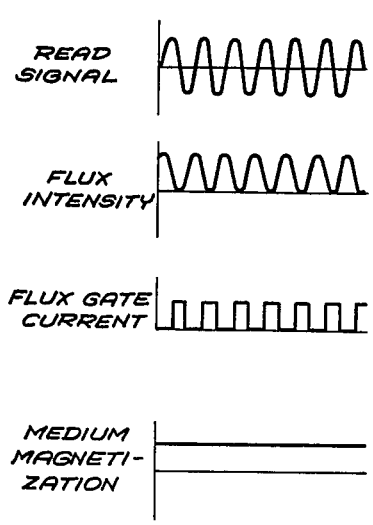
FIGS. 5a and 5b are a series of graphs that illustrate the action of the flux gate in reading information from a stationary and moving medium, respectively.
Figure 5B:
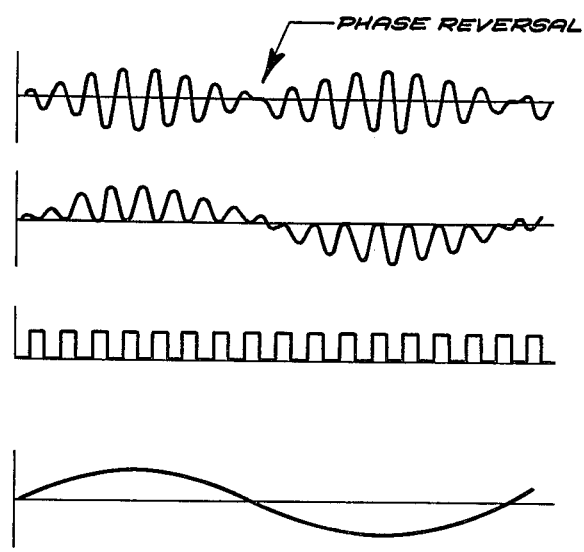

With the subject invention information stored in the medium is read with the aid of the flux gate of the main pole 36. The intensity and polarity of flux induced in the magnetic circuit by the residual magnetization in the medium underlying the main pole are sensed (the medium being either stationary or moving relative to the transducer) by rapidly closing and opening the flux gate, thereby causing the flux in the magnetic circuit to rise and fall rapidly and generating an emf in the sense winding. The flux gate of main pole 36 is closed by removing the current 46 from the central conductor 38. The flux gate is opened by passing a current 46 through the central conductor 38 in the main pole 36 which creates a magnetic field 48, causing the main pole to saturate over its entire height. In effect, the main pole is removed (or open circuited). (Means for applying the flux gate current are not shown in the simplified schematic of FIG. 3.) It should be noted that the saturating field 48 in the main pole is closed around the central conductor 38 and is orthogonal to the flux 50 induced in the main pole by the residual magnetization in the medium, and consequently there is no undesirable interaction between the two magnetic circuits. The relationship of the read signal to flux intensity in the main pole, flux gate current and medium magnetization when employing the flux gate to read stationary and moving media is illustrated in the graphs of FIGS. 5a and 5b, respectively. A "1" is distinguished from a "0" by the phase of the induced emfs in the sense winding in relation to the applied flux gate current, as is well understood in the art.

Signal amplitude, waveform, signal to noise ratio and bit shift characteristics are optimized when the residual magnetization of the medium is large, the head-medium separation is minimized, the reluctance of the unsaturated main pole is low and the ratio of reluctance in the saturated and unsaturated states is very high, the time required to open and close the flux gate is very small, the resonant frequency of the sense winding and associated circuitry is high relative to the frequencies of the signals generated in the sense winding by the action of the flux gate, and the frequency of flux gate activation is several or more times that of the bit rate so that the intensity of residual magnetization in the medium is sensed at or near its maximum intensity. These conditions will be examined in order.

Presently available media (having a coercive force of the order or 1300 oersteds and residual magnetization of 500-600 emu/cc) overlaid on permalloy substrates readily meet the requirements for high density perpendicular recording. Head-medium separation (flying height) of the order of 0.25 micrometers enables linear recording densities of the order of 20,000 bits/cm (50,000 bits/inch). Much higher linear densities (100,000 bits per inch or greater) are possible when the head is operated in sliding contact with a relatively slow moving medium.

The reluctance of the unsaturated main pole may be made adequately low utilizing materials, e.g., permalloy, having an effective permeability of the order of 1000. Since the main pole is saturated over substantially its entire height, its reluctance may be made to increase by two or more orders of magnitude, causing the flux linking the sense winding to decrease to a very small level. The current required to saturate the main pole is determined by the coercivity of the high permeability material, the length of the magnetic path (essentially twice the track width) and the proportion of the total current which is carried by the central conductor. The proportion of current through the central conductor should be large (80% or greater) in order to minimize the current required to saturate the main pole. Since the ratio of conductivity of copper and permalloy is of the order of 20:1, a central conductor having a thickness 20% that of the main pole (the remainder being permalloy) will carry approximately 80% of the total current. Thus, for example, a main pole one micrometer thick and ten micrometers wide, made of permalloy (having a coercive force of 0.1 oersteds or less) with a central copper conductor 0.2 micrometers thick, can be saturated by a current of 2–5 milliamperes flowing through it.

The switching time of the flux gate, i.e., the time required to saturate or unsaturate the main pole, may be made very small (of the order of 10 nanoseconds or less) if the high permeability material is deposited (by means well understood in the art) in such a manner that the easy axis of magnetization coincides with the direction of the saturation field 48 (FIG. 3), thus avoiding the formation of domain walls and time delays associated with domain wall movement. Saturation is accomplished by the simultaneous rotation of electron spins throughout the high permeability material. Moreover, the speed with which the main pole may respond to changes of flux intensity in the medium is very great since there are no time delays associated with the movement of closure domains as is the case with conventional thin film heads. This problem in conventional thin film heads is discussed by R. E. Jones, Jr., in "Domain Effects in the Thin Film Head" *IEEE Transactions on Magnetics*, Vol. 15, No. 6, November 1979.

The resonant frequency of transducers of the type shown in FIG. 3 is determined largely by factors not directly related to the operation of the transducer, e.g., the leakage inductance of the transducer, the inductance and capacitance of the signal lead pairs and the input capacitance of the read amplifier. Transducers with single-turn drive/sense windings and short lead pairs connected to low noise read amplifiers may have a resonant frequency of the order of $10^9$ Hz, which is well above the signal frequencies generated by the action of the flux gate.

Finally, the high switching speed and relatively low current requirement of the flux gate make it possible to excite the flux gate (turn it on and off) very rapidly (on the order of 50 MHz), thereby enabling the sensing of flux intensity at or near the maximum level, as bits pass under the main pole.

Figure 6:
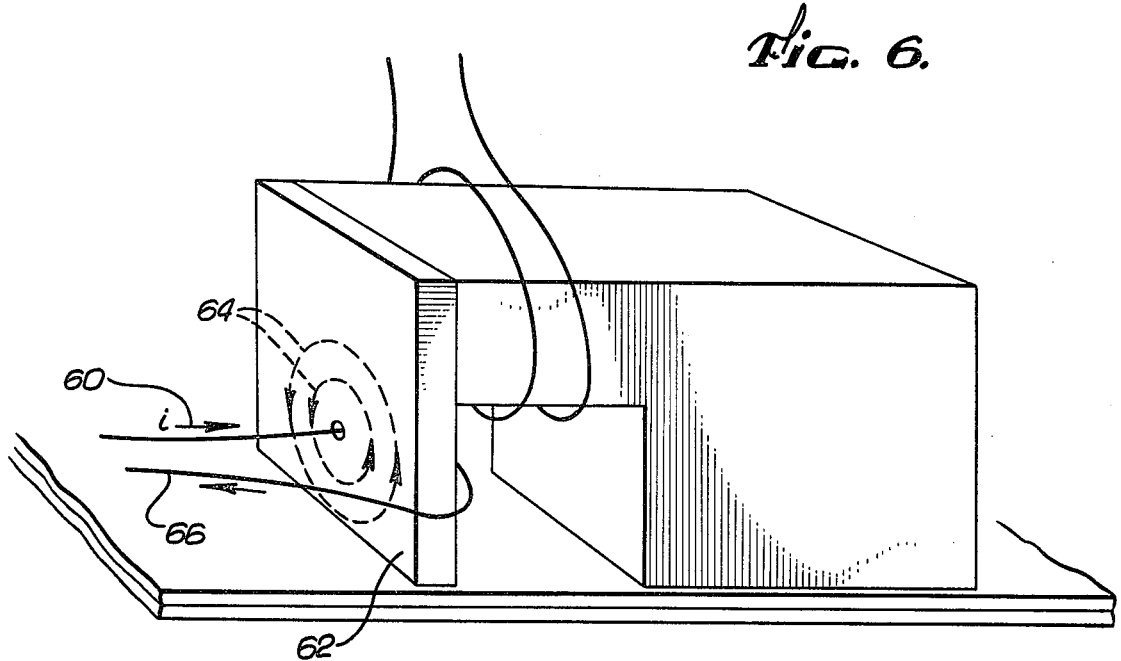
FIG. 6 is a perspective view of another embodiment of the present invention.

It should be noted that transducers, similar in principle to that shown in FIG. 3 and within the broad scope of the invention, can be constructed utilizing the more conventional form of flux gate shown in FIG. 6, in which a current 60 is passed, via conductor 66, through a hole in the main pole 62, thereby creating a saturating field 64, as shown in FIG. 6. However, such configurations would generally provide a lower ratio of reluctance in the open and closed states and are difficult to fabricate in microminiature form.

While the realization of high density recording is a significant aspect of the present invention, an objective of equal or greater importance is to facilitate more flexible and rapid communication with mass data storage systems through the use of multitrack transducers. Such transducers make feasible the fabrication of fixed head-per-track mass data storage systems, vitually instantaneous addressing of tracks and simultaneous communication with many tracks of the medium, thereby greatly increasing the rate of data flow to and from mass storage systems. This objective has received little attention heretofore, since the fabrication of high-density, multitrack transducers, involving conventional recording technology, is difficult and costly. The development of thin film heads in recent years has facilitated the fabrication of multitrack transducers. However, the need to allow space between adjacent heads for the fabrication of individual windings and lead pairs significantly limits the density (number of heads per inch) of such arrays. This problem makes the fabrication of arrays of heads with multiturn drive/sense windings especially difficult. A similar problem exists in the construction of arrays of single-pole perpendicular heads (of the type shown in FIG. 1), since individual windings and lead pairs are required for each main pole.

The utilization of flux-gated main poles, of the form shown in FIG. 3, enables a common drive/sense winding to be employed in multitrack transducers, thereby eliminating the need to allow space between adjacent poles for the fabrication of individual windings and lead pairs and greatly simplifying the fabrication of such transducers. This important advantage results from the fact that main poles (tracks) may be addressed by switching magnetic circuits rather than sense-winding circuits and by the fact that the flux gate (address) conductors (38-FIG. 3, 73-FIG. 7) are colinear with the main poles. By employing the flux gates to saturate all but one of the main poles 70, the transducer of FIG. 7 reverts, in effect, to the single-pole head of FIG. 3.

Figure 7:
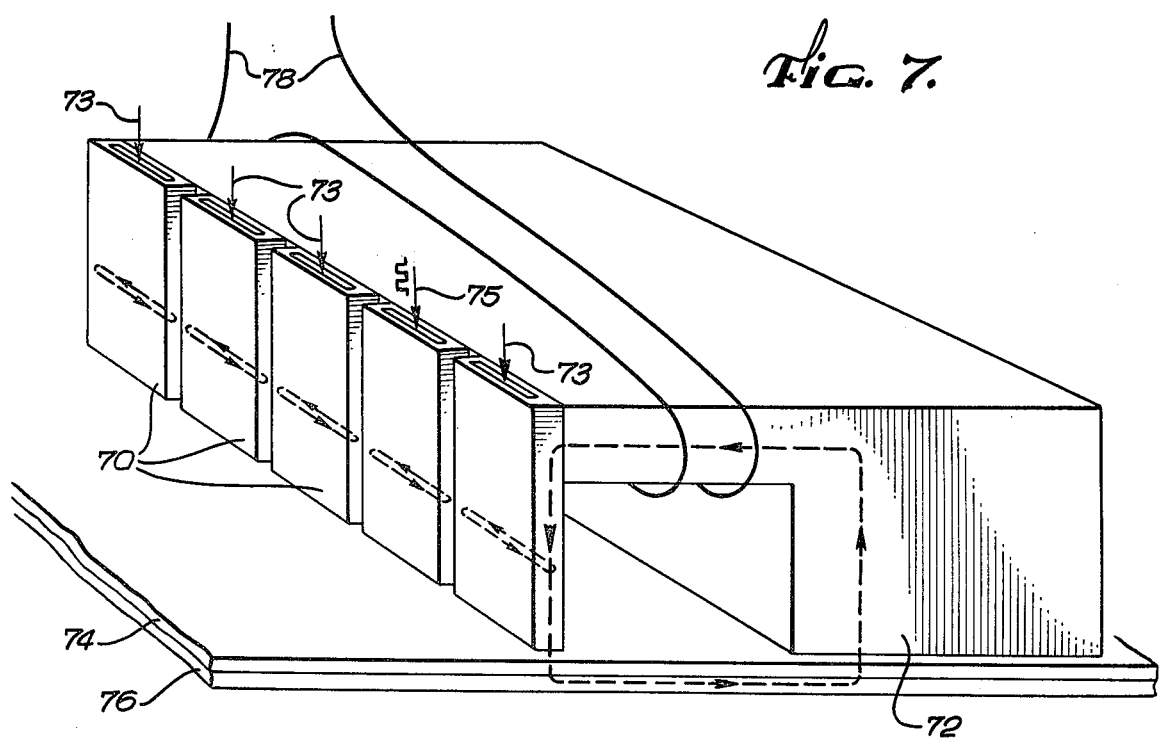

In the multipole (multitrack) transducer shown schematically in FIG. 7, flux-gated main poles 70 are joined to a common flux-closing pole 72, thereby forming multiple, independent magnetic circuits with the medium 74 and underlying high permeability substrate 76. Each magnetic circuit is linked by the common drive/sense winding 78. Steady-state currents through all but one of the main poles 70 (indicated by arrows 73) saturate those (nonaddressed) main poles. (Means for applying the flux gate currents are not shown.) Information in the addressed track may then be read by rapidly switching on and off the current (indicated by arrow 75) through the addressed main pole. Recording is accomplished similarly to that described for the transducer shown in FIG. 3. Thus, the flux gates in the main poles 70 serve the dual purpose of addressing the desired track and enabling the sensing of the polarity and intensity of residual magnetization in the addressed track of the medium. Moreover, the flux gate may be used to control the recording of information in the addressed track, as discussed earlier.

Figure 8:
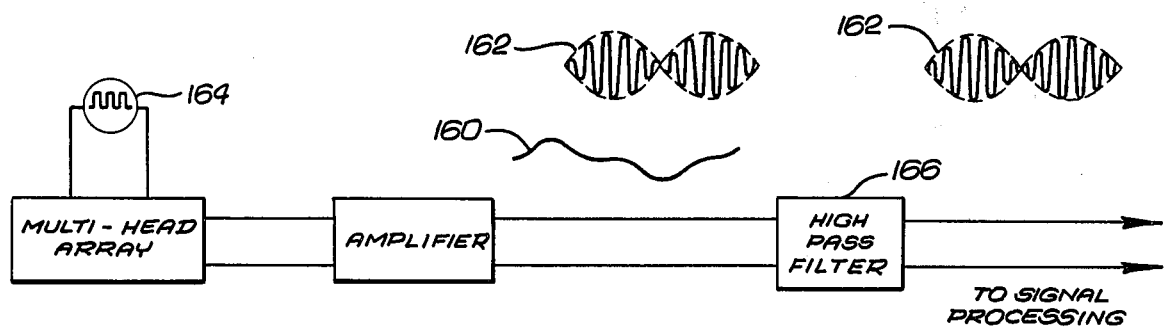
FIG. 8 illustrates the use of a high-pass filter to improve the signal to noise ratio in flux-gated heads and multitrack transducers.

Ideally, the reluctance of all nonaddressed main poles should approach infinity in order to minimize spurious signals in the common sense winding, resulting from the sensing of flux transitions (time rate of change of flux) in nonaddressed tracks. However, while the reluctance of those magnetic circuits is very large it is not infinite and a very small flux transition-induced emf would be produced by each nonaddressed main pole, the sum of which would add algebraically to produce noise in the sense winding. While such emf's would tend to cancel statistically, the possibility exists that they might combine to produce an unacceptably high noise signal, depending on the amplitude of the individual emf's and the total number of poles in the array. For the case of relatively low medium velocity (therefore extremely low flux transition-induced emf's) and relatively small arrays (i.e., few poles), flux transition-generated noise would present no problem. In the case of relatively high medium velocity and large arrays, means to reduce such noise to acceptable levels may be required. One way that this may be accomplished is through the use of a highpass filter in the read circuit which transmits the signal produced by action of the flux gate in the addressed pole, while rejecting lower frequency signals, as illustrated in FIG. 8. Signals from the common-winding multihead array would consist of relatively low frequency components 160, resulting from the sensing of flux transitions in non-addressed tracks, superimposed on the high frequency signal 162, produced by action of the flux gate current 164 in the addressed pole. A highpass filter 166 passes only the desired flux gate signal 162, which may then be processed in the conventional way. Such means would be most effective when the flux gate is excited at a frequency many times the bit rate and would therefore be a preferred method in that mode of flux gate operation.

Figure 9:
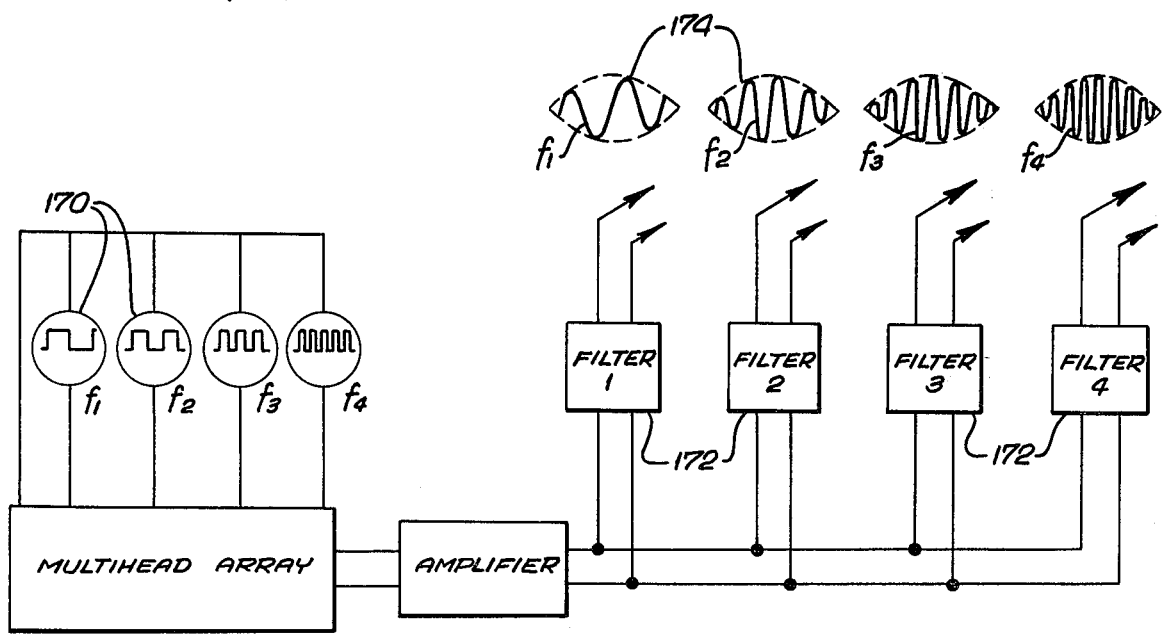
FIG. 9 illustrates the use of multiple flux gate excitation sources of different frequencies together with appropriately tuned filters to permit simultaneous reading on multiple tracks of a common-winding, multitrack transducer.

The utilization of tuned filters in conjunction with pulse excitation of flux gases in common-winding, multihead arrays may be employed to permit simultaneous reading of more than one track. This may be accomplished through the use of excitation sources of different frequencies and appropriate, narrow-pass tuned filters such that the composite signal in the common winding may be separated into individual signals, each unique to a designated head, as shown in FIG. 9. Signals from the common-winding, multihead array, each pole of which would be simultaneously excited by flux gate currents 170 of different excitation frequencies $f_1$, $f_2$, $f_3$, $f_4$, would be the composite of signals resulting from the action of the flux gates superimposed on signals (noise) produced by the sensing of flux transitions on each track. Narrow-pass filters 172 would pass signals 174 for subsequent signal processing, while rejecting all other signals.

In recording, main pole 70 (FIG. 7) in the array may be addressed simply by applying saturation currents to the flux gates of all nonaddressed poles, thereby preventing the record current in the common winding 78 from producing a magnetic field at the tip of those poles sufficiently large to alter the residual magnetization of the medium in the associated tracks. Alternatively, saturation currents may be applied to the flux gates of all poles coincident with the application of a DC current of appropriate polarity to the common record winding. Recording on a selected track could then be achieved by removing, at appropriate times, the saturation current from the flux gate in the addressed pole, thereby enabling the relatively small flux gate current to control the write process, as discussed earlier. Such means of recording would require an initial erase operation, since the polarity of the record current would be fixed.

It should be noted that the multitrack transducer of FIG. 7 may be operated in the more conventional manner to sense time rate of change of flux rather than flux intensity, with the flux gates serving only to address the desired track. In this mode of reading the main pole on the addressed track is left unsaturated, enabling it to sense flux transitions (in the conventional manner) in that track. However, noise generated by flux transitions in the nonaddressed tracks limits the size (number of tracks) of such arrays.

Figure 10:
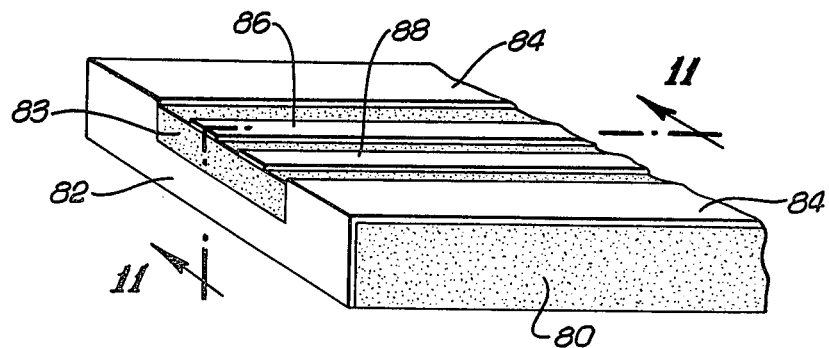
Figure 11:
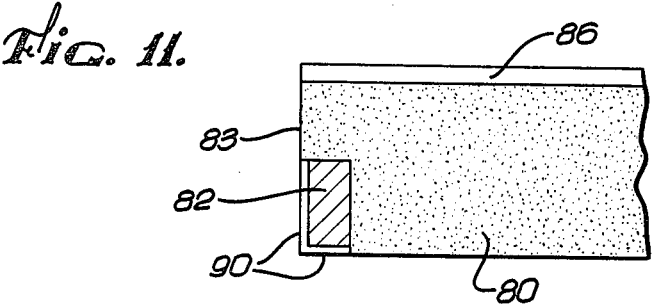

Transducers of the form shown in FIGS. 3 and 7 may be fabricated on the end of ferrite wafers (150 micrometers or more in thickness), the bottom surface of which may serve as a flux-closing pole 80 (FIG. 10). The drive/sense winding conductor 82 (shown for convenience as a single turn winding) is formed of aluminum in a recessed area on the end of the wafer such that, after lapping, the surface of conductor 82 and ferrite 83 are coplanar, as shown in FIG. 10. Lead pairs 84 for the drive/sense winding 82 and flux gate connector conductors 86 and 88 are formed of aluminum on the top of the wafer. The aluminum drive/sense conductor 82 is then anodized and the pores in the oxide layer are sealed, thereby forming a thin insulating layer 90 of aluminum oxide over all exposed surfaces of conductor 82, as shown in FIG. 11, which is a side plan view taken in section along the line 19—19 in FIG. 10. Alternatively, other nonmagnetic conducting materials, e.g., copper, and other insulating materials, e.g., SiO$_2$ or organic materials, may be used to fabricate and insulate the drive/sense conductor 82.

Figure 12:
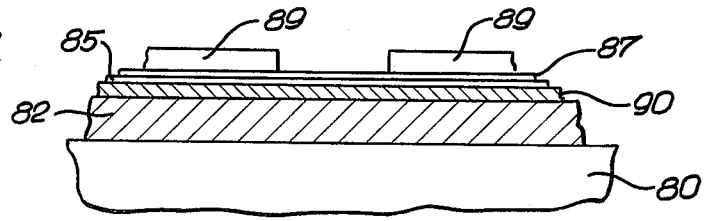
Figure 13:
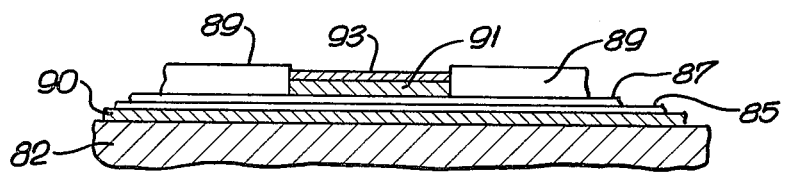

The main pole 92 is then fabricated on top of the insulating layer 90 (overlapping drive/sense winding 82) and ferrite bridge 83, making electrical contact with flux gate connector conductor 86 on the top surface and extending to the bottom surface. In fabricating the main pole, adhesion layer 85 (e.g., titanium) and plating base layer 87 (e.g., permalloy) are deposited on the end of the wafer, after which the end of the wafer is coated with photoresist 89, except for a narrow strip where the main pole is to be formed, as shown in cross-section in FIG. 12. A layer 91 of permalloy is plated through the photoresist mask 89 in the presence of a transverse magnetic field (arrow 97), after which a layer 93 of copper is plated on top of the permalloy layer 91 (FIG. 13). Subsequently, the photoresist is removed and the thin plating base layer 87 and adhesion layer 85 are selectively etched away (except under the main pole). The end of the wafer is again coated with photoresist and processed so that photoresist forms a thin strip (5-10 micrometer wide) over conductor 93 at its lower extremity. The unit is again placed in the permalloy plating bath and permalloy layer 95 is plated on top and around the edges of the copper layer 93 to the same thickness as layer 91. This forming of layer 95 completely encloses copper conductor 93 with a uniform layer of permalloy (FIG. 14), except at the lower extremity of the main pole as shown in FIG. 15, which is a side plan view taken in section along line 19—19 in FIG. 10. The composition and thickness of the high permeability material surrounding the central conductor is made uniform in order to ensure ubiquitous saturation of the main pole when current is passed through it. The thickness of the single permalloy layer 91 at the lower tip of the main pole determines the main pole length and therefore the minimum bit length which may be read. Finally, flux gate connector conductor 94 is fabricated, electrically connecting the main pole 92 at its lower extremity with flux gate connector conductor 88 on the top surface (FIG. 16). The path of flux gate current is indicated by arrows 96.

The multitrack transducer shown in FIG. 17 is fabricated in a similar manner, except that there is no need for the return flux gate connector conductor 88 (FIG. 16), since the direction of flux gate current flow alternates from one pole to the next, thus providing multiple return current paths, as shown by arrows 98 in FIG. 17. Steady-state flux gate currents of appropriate polarity are applied to main poles 100 (nonaddressed tracks), causing those main poles to saturate, while the flux gate current in main pole 102 is rapidly switched on and off (arrow 106), causing that main pole to saturate periodically and thereby generating an emf in the common sense winding 104, whose amplitude and phase correspond to the intensity and polarity of the residual magnetization in the medium (not shown) underlying main pole 102.

In the foregoing, drive/sense windings have been represented as single-turn conductors, in order to simplify the illustrations and discussion. It will be appreciated that the use of a common drive/sense winding in multitrack transducers has special significance for the fabrication of multiturn drive/sense windings, which generally make even greater demands on space for the fabrication of conductors and leads. Also, while the transducer described herein may be operated in sliding contact with slow moving media, thereby providing numerous advantages in performance, they may be supported above (not in contact with) rapidly moving media in the conventional manner. Moreover, while the performance of these transducers is optimized when used in conjunction with perpendicularly oriented media overlaid on high permeability substrates, such composite or double-layer media are not essential to the functioning of such transducers.

In summary, the present invention provides improvements in recording transducers which enable very high density recording and the economical fabrication of multitrack transducers that facilitate more flexible and rapid communication with mass data storage systems. While the principal concern in the development of the system has been with the storage of digital data on rotating media such as disk or drum, the technology is applicable to tape and card digital storage systems and to the recording of information or signals in analog form (e.g., audio, video and instrumentation). It should be noted that although particular embodiments have been described herein, many variations and modifications will become apparent to those skilled in the art. Therefore, the scope of the invention should be determined with reference to the appended claims rather than the foregoing description.

I claim:

1. A transducer in cooperative relationship with a magnetic media for writing thereof and reading therefrom comprising:
   a magnetic path constructed for perpendicular recording and reproduction on and from the magnetic media,
   said magnetic path being constructed of a magnetic material having a high permeability and a low reluctance which facilitates the efficient passage of magnetic flux through said magnetic path, and a flux gate means coupled to said magnetic path for selectively creating a magnetic field in said magnetic path during either reading or writing which in effect increases the reluctance of the magnetic path to prevent the effective passage of magnetic flux therethrough whereby said magnetic path for perpendicular recording and reproduction can be closed and opened.

2. The structure cited in claim 1 wherein the flux gate means comprises:
a conductor that is in a surrounded relationship with respect to a portion of the magnetic path with the direction of the current flow therein in an aligned direction with respect to the direction of the flux in the magnetic path.

3. The structure cited in claim 2 wherein the magnetic path at least in the vicinity where it is in surrounded relationship with the conductor has its magnetic structure aligned in such a direction as to facilitate rapid saturation and desaturation of that portion of the magnetic path.

4. A transducer for perpendicular recording and reproduction on a magnetic media comprising:
a magnetic element of a magnetic material having a high permeability and low reluctance, said magnetic element having a flux pole perpendicular to the magnetic media surface terminating in a pole tip adjacent the media, said pole defining a principal magnetic flux path therealong for recording on or reproduction from the media;
means coupled to said magnetic element for creating a magnetic field in said pole transverse to said magnetic path to vary the reluctance of the principal magnetic path; and
winding means coupled to the magnetic element to interact with the flux in said flux pole.

5. The invention as set forth in claim 4 above, wherein the transducer provides recording and reproduction of the order of 100,000 bpi or greater, and wherein the magnetic element comprises thin film means having a pole tip less than 1 micrometer in length relative to the media.

6. The invention as set forth in claim 4 above, wherein said means for varying the reluctance of the principal magnetic path comprises a central conductor perpendicular to the media and the magnetic pole is configured as an envelope about the central conductor.

7. A perpendicular recording and reproduction head of the type having a flux closing body magnetically coupled to an elongated main pole confining a flux along its height and comprising:
first means along the height of the main pole for varying the reluctance of the main pole to vary the main flux therein; and
winding means coupled to the recording head to interact with the main flux in the main pole.

8. The invention as set forth in claim 7 above, wherein the main pole and the means for varying reluctance comprise an envelope of magnetic material about a single thin conductor.

9. The invention as set forth in claim 8 above, wherein the means for varying the reluctance of the main pole operates in a time relationship with a data rate, whereby interactions between main flux variations and the winding means are operative at the data rate.

10. The invention as set forth in claim 9 above, wherein the head is used for reproduction and the winding means senses the change in main flux when the reluctance is changed to a low level from a high level, such that the head is flux sensitive.

11. The invention as set forth in claim 9 above, wherein the head is used for recording and the combination further includes a uniformly premagnetized medium, the winding means providing a constant writing bias to tend to magnetize the medium in the opposite direction, and the reluctance variations therefore determine the recorded pattern on the media.

12. The invention as set forth in claim 7 above, wherein the height of the main pole is at least 20 times greater than the length of the main pole along the media, and wherein the means for varying the reluctance operates along the height of the main pole.

13. The invention as set forth in claim 7 above, wherein the length of the flux closing body along the media is greater than ten times the length of the main pole along the media, and wherein the path of the main flux is closed in substantial part via the medium.

14. A transducer for magnetic recording and reproducing on and from a magnetic media comprising:
a plurality of magnetic paths constructed for perpendicular recording and reproduction on the magnetic media,
said magnetic paths being constructed of a magnetic material and having a high permeability and low reluctance which facilitates the efficient passage of magnetic flux through said magnetic paths;
a switching means coupled to each of said magnetic paths for selectively switching any of said magnetic paths from a low reluctance to a high reluctance; and
a continuous conductor means in proximity to a plurality of said magnetic paths for sensing the magnetic flux passing through said plurality of magnetic paths.

15. The structure recited in claim 14 wherein said switching means comprises:
a flux gate means coupled to each of said magnetic paths for selectively creating a magnetic field in said magnetic paths, which is orthogonal to said paths, to increase the reluctance of the selected magnetic paths to prevent the effective passage of magnetic flux therethrough said selected magnetic paths.

16. A magnetic head for use in perpendicular recording on a magnetic medium functioning as part of the flux return path comprising:
a main magnetic pole lying along a perpendicular recording axis and forming a closed path about the axis, the main magnetic pole having a pole tip adjacent said magnetic medium;
conductor means within the closed path for magnetizing the main magnetic pole in the direction of the closed path with a gating current; and
means including winding means for interacting with magnetic flux variations along the perpendicular recording axis in a flux path including the magnetic medium.

17. The invention as set forth in claim 16 above, wherein the gating current varies the reluctance of the main magnetic pole to vary flux along the perpendicular recording axis.

18. A magnetic head suitable for use in perpendicular recording and reproduction, comprising:
a main pole of high permeability material;
a flux closing pole of high permeability material;

a bridge member connecting the main pole to the flux closing pole;

said main pole, flux closing pole and bridge member forming part of a magnetic circuit;

a sense winding coupled to said magnetic circuit; and a flux gate means for selectively saturating at least a portion of said magnetic circuit either during recording or reproduction whereby flux passing through the main pole may be effectively coupled and decoupled to and from said sense winding.

19. A magnetic head as set forth in claim 18 above, wherein said flux gate means forms at least part of said main pole for selectively saturating at least a portion of the main pole.

20. A magnetic head as defined in claim 19 wherein the main pole comprises an elongated conductor element surrounded over at least a portion of its height by a layer of high permeability material.

21. The magnetic head as defined in claim 19 wherein the flux closing pole is formed from a wafer of high permeability magnetic material member having an end surface, bottom surface and top surface with said bottom surface adapted to be positioned adjacent a magnetic media; said main pole formed on said end surface by successive thin layers of a magnetic material, a conductive material and a magnetic material with said layers of magnetic material surrounding said layer of conductive material and with the portion of said main pole adjacent to the medium magnetically insulated from said end surface.

22. The magnetic head defined in claim 21 wherein the second layer of said magnetic material terminates at a position further removed from the magnetic medium than said first layer of magnetic material which extends to a position in close proximity to said magnetic medium.

23. A multitrack magnetic head for recording and reproducing on a magnetic medium comprising:
- a plurality of main poles spaced apart and in a given plane lying perpendicular to;
- flux closing means magnetically coupled to the main poles at a spacing from said magnetic medium;
- winding means coupled to the magnetic circuit formed by the main poles and the flux closing means; and
- means coupled to the main poles for varying the reluctance thereof in selectable combinations, whereby only certain pole means function as a transducer at any time.

24. The invention as set forth in claim 23 above, wherein the means for varying reluctance comprises internal conductors within the main poles.

25. A multitrack magnetic head suitable for use in perpendicular recording, comprising:
- a wafer of high permeability material having an end surface, a top surface and a bottom surface adapted to be positioned adjacent a magnetic medium; said wafer forming a flux closing pole;
- a plurality of main poles formed on said end surface and extending to a position adjacent said magnetic medium;
- said main poles being magnetically connected to one portion of the flux closing pole removed from the magnetic medium and being magnetically isolated from said flux closing pole adjacent said magnetic medium;
- said main poles and flux closing pole adapted to form a plurality of magnetic circuits when positioned adjacent said medium;
- a sense conductor coupled to said magnetic circuits; and
- a flux gate means for each of said main poles for selectively saturating at least a portion of each of said magnetic circuits.

26. The multitrack magnetic head defined in claim 25 wherein each main pole functions as a head for a separate track on the magnetic medium and said sense conductor being a single conductor in close proximity to a plurality of main poles.

27. The multitrack magnetic head defined in claim 26 wherein said main poles extend in a direction from said top surface to said bottom surface and said sense conductor extends in a direction across said main poles.

28. A magnetic head suitable for use in perpendicular recording, comprising:
- a main pole of high permeability material;
- a flux closing pole of high permeability material;
- a bridge member connecting the main pole to the flux closing pole; said main pole and flux closing pole having lower surfaces which are substantially coplanar, the cross-sectional length of the lower surface of the flux closing pole being substantially greater than that of the main pole;
- a sense winding located between the main pole and flux closing pole; and
- a flux gate conductor coupled to the main pole for providing a saturating current to the main pole.

29. The magnetic head of claim 28 wherein the flux gate conductor extends along the height of the main pole and is surrounded thereby, said flux gate conductor thereby providing a saturating current which causes the main pole to be saturated along a substantial part of its height.

30. A magnetic head suitable for use in perpendicular recording, comprising:
- a wafer of high permeability material, said wafer including a front surface and top and bottom surfaces; wherein the bottom surface of the wafer defines a flux closing pole,
- a sense winding comprising at least one layer of a conductive material extending laterally across the front surface of the wafer and covering a lower portion of said front surface;
- at least a pair of winding leads, each comprising a layer of conductive material connected to said sense winding and extending rearward from the front surface along a surface of the wafer;
- a layer of insulation insulating the sense winding from the main pole;
- a flux gate main pole located on the front surface of said wafer, said flux gated main pole comprising a first layer of high permeability material extending substantially from the top to bottom surfaces of the wafer, a layer of electrically conductive material overlaying the first layer and a second layer of high permeability material overlaying the conductive layer and extending to join said first layer, said first and second layers of high permeability material defining the main pole, wherein the main pole is isolated from the sense winding by said insulation layer; and
- flux gate connector conductors electrically connected to the flux gate main pole, and electrically isolated from the winding leads.

31. A multitrack magnetic head suitable for use in perpendicular recording, comprising:
   a wafer of high permeability material, said wafer including a front surface and top and bottom surfaces; the bottom surface of said wafer defining a common flux closing pole,
   a sense winding comprising at least one layer of a conductive material extending laterally across the front surface of the wafer, and covering a lower portion of said front surface;
   at least a pair of winding leads, each comprising a layer of conductive material connected to said sense winding;
   a layer of insulation insulating the sense winding from the main pole;
   a plurality of spaced flux gated main poles located on the front surface of the wafer, each of said main poles comprising a first layer of high permeability material extending substantially from the top to bottom surface of the wafer, a layer of conductive material overlaying the first layer of high permeability material, and a second layer of high permeability material overlaying the conductive layer and extending to join said first layer, said first and second layers defining the main pole, wherein the main pole is isolated from the sense winding by said insulation layer; and
   a plurality of flux gate connector conductors of conductive material overlaying one of the surfaces of the wafer, one each of said flux gate conductors being connected to said conductive layer of the main pole flux gate; and
   a bus conductor of conductive material connecting said conductive layer of each main pole in the vicinity of the bottom surface.

32. The head of claims 30 or 31 wherein said wafer is ferrite, said main pole is nickle-iron alloy, and said sense winding, winding leads, flux gate and flux gate conductors are copper.

33. The head of claims 30 or 31 wherein the end of the first layer of the main pole in the vicinity of the bottom surface extends beyond the same end of the second layer of the main pole, whereby the length of the first layer determines the effective length of the main pole.

34. The head of claim 31 further including:
   a pulse current source connected to the head for selectively applying a pulsed gate current to each main pole to be addressed, and
   a band pass filter, coupled to the winding leads of the head, which passes a frequency range including the frequency of the pulse gate current, said current source and band pass filter increasing the signal to noise ratio of the head.

35. The head of claim 34 wherein the filter is a high pass filter and the head is used to read digitally recorded information, said high pass filter blocking frequencies at or below the bit rate of the digitally recorded information, whereby noise caused by flux variations in non-addressed poles will be filtered from the output of the head.

36. The head of claim 31 further including:
   a plurality of pulse current sources connected to the head for providing pulse gate currents of different frequencies to the main poles of the head; and
   a plurality of tuned filters coupled to the winding leads of the head, each filter passing a different frequency range wherein each frequency range includes the frequency of one of the pulse gate currents, said current sources and tuned filters increasing the signal to noise ratio of the head and enabling simultaneous reading on different tracks of the head.

37. A perpendicular recording head for recording on a magnetic medium comprising a magnetic circuit including a main pole, a flux closing body coupled to said main pole and said magnetic medium; said main pole comprising an elongated body having a height, a length and a width, said length generally aligned with the direction of the movement of the recording medium, said width generally extending in a direction across said recording medium and said height generally extending at an angle to the surface of said recording medium; said main pole having a height to length ratio greater than twenty to one; and means within and along the height of said main pole for varying the reluctance of the main pole substantially independent of the flux in the magnetic circuit.

* * * * *